Figure 1:
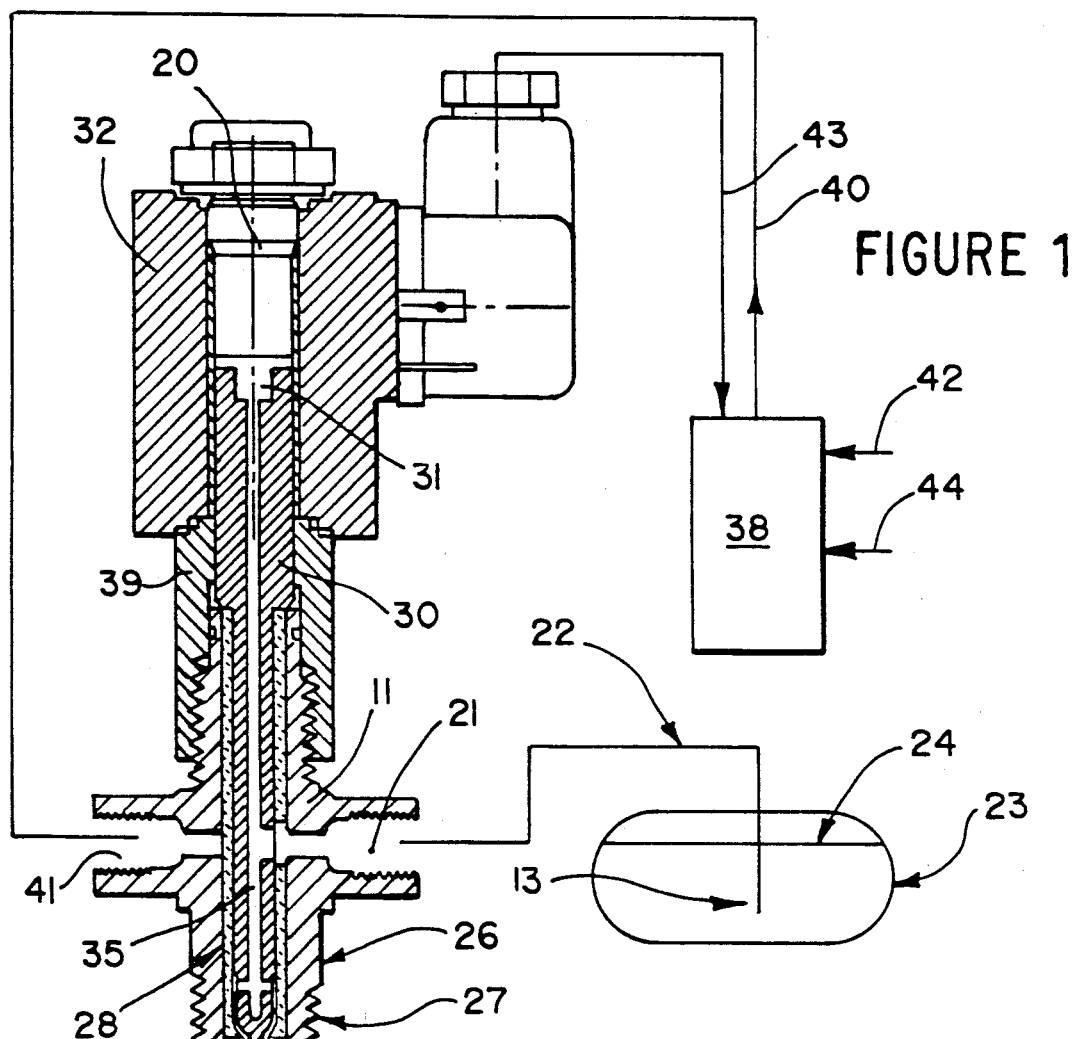

United States Patent [19]

Donaldson

[11] Patent Number: 5,076,244
[45] Date of Patent: Dec. 31, 1991

[54] FUEL INJECTOR

[75] Inventor: John H. Donaldson, Victoria, Australia

[73] Assignee: Gas Outboards International Pty., Ltd., Melbourne, Australia

[21] Appl. No.: 499,317

[86] PCT. No.: PCT/AU88/00461
§ 371 Date: Jul. 17, 1990
§ 102(e) Date: Jul. 17, 1990

[87] PCT Pub. No.: WO89/04920
PCT Pub. Date: Jun. 1, 1989

[22] PCT Filed: Nov. 25, 1988

[30] Foreign Application Priority Data

Nov. 25, 1987 [AU] Australia .............................. PI 5599

[51] Int. Cl.$^5$ .............................................. F02M 53/04
[52] U.S. Cl. .................................. 123/527; 123/499; 239/585
[58] Field of Search ................ 123/41.31, 497, 499, 123/525, 527; 239/585, 397.5, 117, 132, 128

[56] References Cited

U.S. PATENT DOCUMENTS

| | | | |
|---|---|---|---|
| 4,421,280 | 12/1983 | Lewis et al. | 239/585 A |
| 4,434,940 | 3/1984 | Kupper | 239/397.5 |
| 4,528,966 | 7/1985 | Lent | 123/527 |
| 4,718,386 | 1/1988 | Gieles | 123/499 |
| 4,768,476 | 9/1988 | Behnke | 123/90.51 |
| 4,796,572 | 1/1989 | Heydrich | 123/41.42 |
| 4,817,873 | 4/1989 | McKay | 239/397.5 |
| 4,865,001 | 9/1989 | Jensen | 123/525 |

FOREIGN PATENT DOCUMENTS 834826  5/1960  United Kingdom .

Primary Examiner—E. Rollins Cross
Assistant Examiner—Erick Solis
Attorney, Agent, or Firm—Jenner & Block

[57] ABSTRACT

Injector apparatus for direct injection of liquefied gas fuels, particularly LPG into internal combustion engines, includes a partially stabilized zirconia tube which incorporates a sliding spool therein for controlling a metering orifice of a nozzle. The spool has a tip which extends beyond the nozzle and into the inducted air steam of an engine. Expanding gas entering the air steam from a central gallery in the spool and via the nozzle cools the tip thereby causing heat to be transferred from the spool to the tip thereof.

25 Claims, 2 Drawing Sheets

FUEL INJECTOR

This invention relates to the direct injection of liquified gas fuels into internal combustion engines and more particularly to an injector apparatus, and a method, for the direct injection of such fuels into internal combustion engines.

The invention is applicable equally to two stroke, four stroke, diesel and gas turbine internal combustion engines, although it has particular utility in relation to a two stroke electric ignition engine using liquid gas fuel premixed with a lubricating fluid.

The invention may also be applied to engines which use liquid gas fuels without premixed lubricating fluids. Liquified gas fuels are defined herein as combustible fluids applicable to fueling internal combustion engines, which fluids are, at the ambient temperature and pressure under which the engine operates, in their natural or equilibrium state, a gas (vapour), that is, they are above their boiling point. This range of fuels covers propane, butane and any ratio mixture of these referred to as liquified petroleum gas (LPG), methane and various other substances.

Two stroke or two cycle engines are well known and conventionally use liquid fuels, being fuels which are, at the ambient temperature and pressure at which the engine operates, in their natural and equilibrium condition in a fully liquid state, that is, below their boiling point. Lubrication is required to the crank case for bearings and valving and to the combustion chamber walls for friction reduction and heat transfer. The provision of lubricating fluid which is typically a petroleum based oil, has in the past been mainly through the incorporation of the lubrication fluid in the liquid fuel, typically in the ratio of 1 part lubrication oil to 50 parts liquid fuel, although this ratio differs between various engines. In recent times the mixing of the lubrication oil with the liquid fuel has been undertaken by a special device built into the engine to allow use of standard liquid fuels and also to allow for varying the lubrication oil to liquid fuel ratio in accordance with the engine speed. Another technique also being used is to directly inject lubrication oil either into the inducted air flow or directly into the crank case.

Developments have also occurred to allow for the fuelling of two stroke engines by liquified gas fuels, such as LPG. In this situation the methods have been based on first vapourising the liquid gas fuel, to bring it to a fully gas state which is then directed into the inducted air stream of the engine. This technique does not allow the premixing of lubrication oil with the fuel and therefore the lubrication oil must be separately directed into the inducted air stream. One known technique to achieve this involves modifying the carburettor system and using a viscosity stabilized lubrication fluid (such as an equal part mix of a liquid fuel and a lubricating oil). Another technique is to use a lubrication oil injection system.

The operation of two stroke engines fuelled by LPG has been shown to be reasonably effective and beneficial although there is a reduction in peak power output compared to operation of the same engine on liquid fuels. This reduction is mainly associated with a reduction in air intake and the lower heat content of the LPG.

The application of liquid fuel injection into internal combustion engines is well known. The technique allows for fine atomization of the liquid fuel, which improves the efficiency of the burning cycle, and also allows for precise computer based control of the delivered fuel quantity, which also aids in the optimization of burning efficiency.

The injection of liquified gas fuels has not been successfully developed due to problems associated with fuel pump operation and freezing of the injector device.

In respect to two stroke engines, which require continuous supply of lubrication fluid, the inability to inject, in liquid state, the liquified gas fuels, has required that a separate system for delivering lubrication fluid into the induction system or crank case be used, when they are fuelled by liquified gas fuel which is fed into the induction system in a fully gaseous state.

In respect to the injection of liquid fuels, special design consideration is required to achieve fine atomization of the fuel and repeatable injector operation. This often involves having the inducted air heated to assist with vapourization of the atomized liquid fuel. This situation tends to raise the pressure of the induction system which in turn inhibits the pressure drop across the induction system and therefore the ability to draw air into the engine.

It is an object of this invention to provide an improved injector for internal combustion engines which facilitates injection of liquified gas fuels such as LPG into the engine in a manner providing an increase in the inducted air flow to the engine (and thus an increase in peak power output) when compared with conventional techniques, and/or, in a manner facilitating the use of premixed liquid gas fuel and lubricating oil.

It is a further object of the invention to provide a method of injecting liquified gas fuel such as LPG into an internal combustion engine in a manner providing an increase in the inducted air flow to the engine (and thus an increase in peak power output) when compared with conventional techniques, and/or, in a manner facilitating the use of premixed liquid gas fuel and lubricating oil.

Accordingly, one form of the invention provides a fuel injector for injecting fuel into an internal combustion engine characterized in that, said fuel comprises or includes liquified gas fuel and said injector includes a body portion incorporating a metering device for continuously metering the desired quantity of fuel to an inlet air stream of the engine via a nozzle of the injector, said nozzle being formed of high heat insulating material and said metering device being insulated from said body by high heat insulating material between said metering device and body whereby said liquified gas fuel is cooled below the boiling point of the gas and thus caused to be in a liquid state prior to passing through said nozzle and when entering said air stream, thereby causing a cooling of said inlet air stream in an expansion zone extending from said nozzle into said air stream.

Another form of the invention provides a method of injecting fuel into an internal combustion engine, characterized in that, said fuel comprises or includes liquified gas fuel and said method includes causing said fuel to be cooled to a temperature below the boiling point thereof prior to injection into an inlet air stream of the engine by the step of transferring heat from incoming said fuel at a pre-injection zone into an expansion zone in said air stream.

Figure 2:
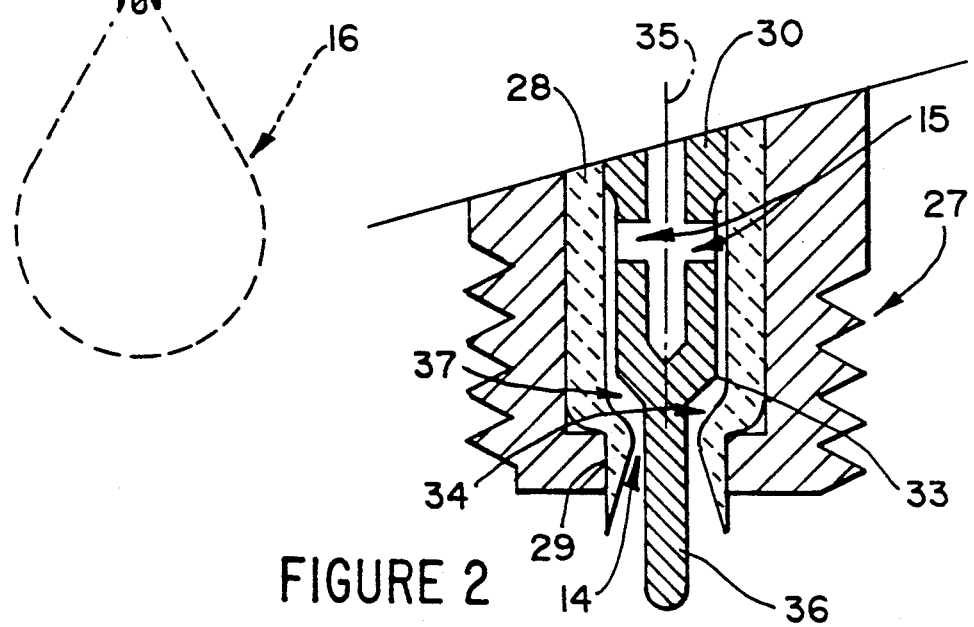

In order that the invention may be more readily understood one particular embodiment will now be described with reference to the accompanying drawings wherein, FIG. 1 is a sectional view of an injector and associated apparatus according to the invention, FIG. 2 is a sectional view on an enlarged scale of the nozzle portion of the injector of FIG. 1, and FIGS. 3, 4 and 5 show various different injection locations for the injector of FIGS. 1 and 2 in relation to the inducted air stream of an internal combustion engine.

In the preferred embodiment the injector apparatus is applied to a two stroke engine, to be fuelled by LPG, which requires continuous input of lubrication fluid; although with LPG which is in a gaseous state inside the engine there is a dramatic decrease in washing away of deposited lubricating oil compared to that which occurs with liquid fuels, and therefore the demand for lubrication oil when using LPG can be reduced from that normally required when operating the same engine on liquid fuels.

In this preferred embodiment the LPG is directed from its pressurized tank 23 directly to the injector apparatus. The key functions of the injector apparatus are to control the flow of LPG from the pressurized storage tank 23 into the inducted air flow of the engine. To achieve this the injector apparatus must lower the temperature of the LPG entering the controlled restriction (nozzle) of the apparatus to below the boiling temperature to ensure that the LPG is in a fully liquid state so that control of the nozzle can be predicted by some control device, such as a computer. The control device must assume the state of the LPG to be a single phase, in this case namely a liquid. The injector apparatus must also prevent excessively low temperatures of its moving parts, which can occur when exposed to boiling LPG, of which the propane component will boil at minus about 42° C.

Referring to FIGS. 1 and 2, the injector apparatus is shown to comprise a body 11 having an inlet port 21 connected by a sealed tube or line 22 (represented schematically) to a sealed storage tank 23. An inlet 13 to the said line 22 is below the normal liquid level 24 of the LPG stored in the tank 23. The line 22 and a fitting (not shown) used to connect into the inlet port 21 are of such a construction as to minimize heat transfer to the transit LPG.

The LPG, which will be mainly liquid but due to being in the storage tank 24 at its boiling point, will after the pressure drop associated with transit through the line 22 be at a temperature, for the given pressure, above its boiling point and therefore vapour content will be present. In other words, the incoming LPG flow into the inlet port 21 will be of mixed liquid/vapour phase.

The injector body 11 comprises a lower body portion 26 which is made from metal, for both strength and heat conduction. This lower body portion 26 has a threaded nose 27 to facilitate connection into an engine. Into this lower body portion 26 a close fitting tubular sleeve 28 is assembled. The sleeve 28 is constructed of a thermally insulating high strength ceramic material which has a high resistance to thermal shock. Partially Stabilized Zirconia (PSZ) or other Advanced Engineering Ceramics are suitable materials for forming the sleeve 28. An end of the sleeve 28 projects from the nose 27 and contains a nozzle 14 and outwardly projecting surround 29 that protrudes past the tip of the lower body portion 27. A spool 30 is assembled into the sleeve 28 so as to be slidable therein. The spool 30 has an internal gallery 35 open to the port 21 for directing the LPG from the inlet port 21 to its upper end 31 which is of a magnetically inductive material such that the the spool 30 will be moved into the solenoid 32 when the solenoid 32 is energized. Thus the LPG is able to fill the space available for the movement of the spool 30 and therefore when the spool 30 is in its downward position provides pressure on the spool to hold the spool with its sealing face 33 against a complementary seat 34 of the sleeve 28. An upper portion 39 of body 11 connects to the lower body portion 26 by way of a sealing thread that allows adjustment such that the travel of the spool 30 can be adjusted. The top end of the upper portion 39 constrains upward movement of the spool and contains the magnetically inductive core to complete the magnetic circuit when the solenoid 32 is energized.

When the solenoid 32 is energized with sufficient electrical current the spool end 31 will be drawn with sufficient force to overcome the pressure of the LPG acting thereon and the spool 30 will move such that the sealing face 33 will move away from the seat 34 of sleeve 28. At this time LPG will be able to flow from the inlet port 21, through an inner gallery 35 of the spool 30 to be then metered by the spool sealing face 33 and the seat 34 of the sleeve 28. The LPG is then sprayed over a protrusion 36 of the spool 30 during which time, due to the LPG now being near atmospheric pressure and at a temperature of about minus 42° C., the boiling point of propane. The protrusion 36 extends beyond the surround 29 and into the induction air stream of the engine. The low temperature surrounding the protrusion 36 will cause the protrusion to drop in temperature, that is, heat will be removed from the protrusion 36 and into the passing cold LPG. This effect will cause heat to be conducted from the main body of the spool 30 to the spool protrusion 36 and in turn the lower temperature spool 30 will conduct heat from the passing LPG flow that is passing through the inner gallery 35 of the spool 30. Therefore the LPG that enters the metering region 37 of the spool, that is, the region of sealing face 33 and the seat 34 of sleeve 28 will be at a lower temperature than when it entered the injector inlet port 21. This temperature drop is arranged to be of such a magnitude, through suitable sizing of all injector parts, that the LPG on entering the said metering region 37 will be below its boiling point and therefore in a fully liquid state. Incidentally, radial ports 15 allow the LPG to pass from the inner gallery 35 to the metering region 37.

With the LPG entering the engine in a fully liquid state a control system, such as a computer controller 38 is provided to receive an input reading 40 of LPG inlet pressure from a separate port 41, or other convenient location. Another input command on connection 42, relating to the power output required from the engine at a particular instant of time enables the controller 38 to generate the required instantaneous electrical current signal on connection 43 to the injector solenoid 32 to allow a predetermined quantity of LPG to be injected into the engine. The controller 38 can also receive a set of feedback signals on connection 44, such as those associated with engine performance, calculated air to fuel ratios and emission gas analysis to allow further optimization of the engine operation through precise LPG metering.

The use of premixed LPG and lubrication oil can be used to allow improved injector operation through providing lubrication to the sliding surfaces between the sleeve 28 and the spool 30.

Figure 3:
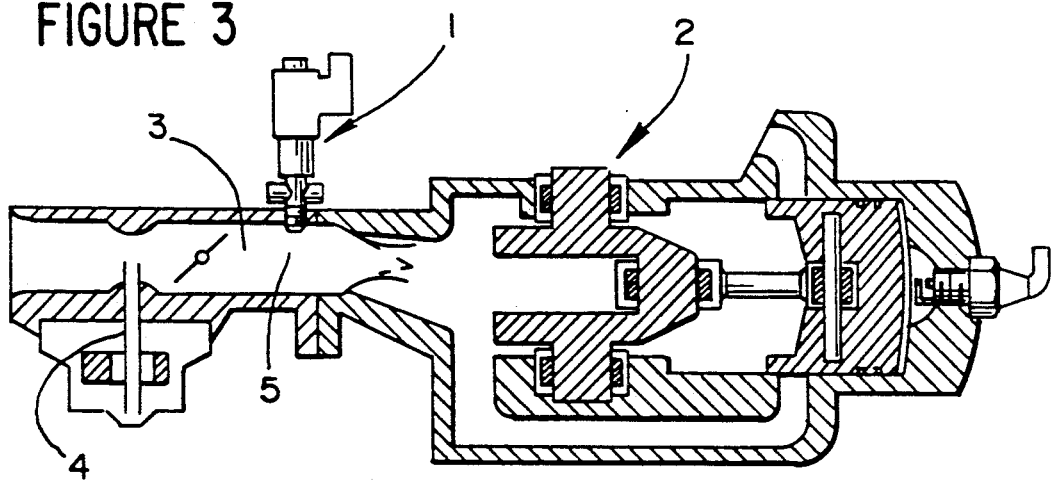

In FIG. 3 the injector apparatus 1 is installed within a carburettor assembly 3 of a two stroke engine 2. The LPG is injected into the inducted air stream, the carburettor system 4 associated with operating the engine on liquid fuels, in the case of a dual fuel supply system, being non-functional at this time. The surrounding components, such as the wall 5 of the inlet duct, which will be contacted by the injected LPG stream are made of or covered by a thermally insulated thermal shock resistant material (not shown), such as Partially Stabilized Zirconia (PSZ) or other advanced engineering ceramics. Therefore the heat transfer to the LPG to achieve its vaporization will come from the inducted air stream. This will reduce the pressure in a zone of the inducted air stream near the injector apparatus therefore increasing the pressure drop between the inlet to the inducted air system and the injector apparatus which, in turn, will increase the flow rate of the inducted air stream. No separate oil injection is required as the lubrication oil is premixed with the LPG. This lubrication oil will be left as a fine mist and be carried throughout the engine by the inducted air flow. This configuration shown in FIG. 3 is well suited to conversion of existing two stroke engines operating on liquid fuel, to operation on LPG.

Figure 4:
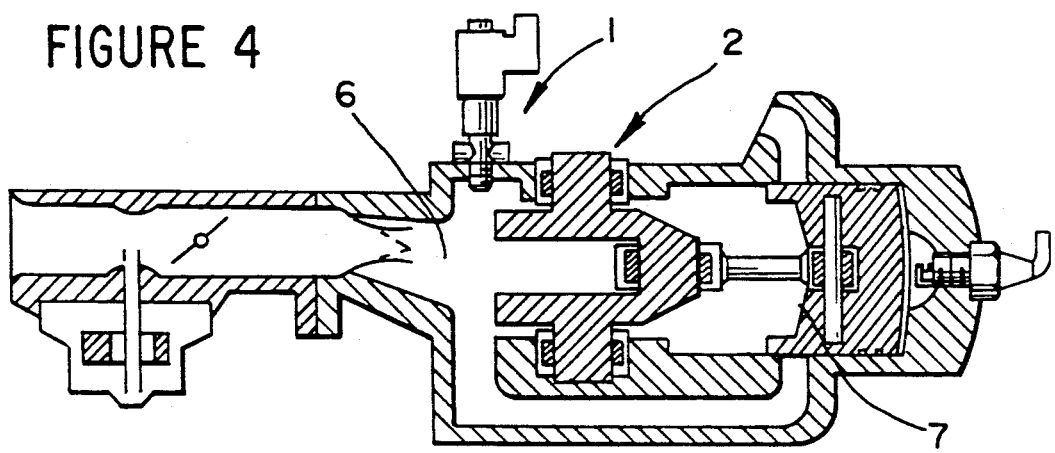

Another location for the injector apparatus is shown in FIG. 4 where the injector apparatus 1 directs the liquid LPG directly into the crank case 6 of the engine 2. In this location it will still achieve the drop of temperature and pressure and therefore increase the pressure drop across the induction system but it now may also be used to improve the direction of the resulting lubrication oil flow and also achieve some cooling of specific parts such as the piston 7. This location may also allow for a simpler induction system and a simpler conversion from liquid fuel to LPG operation.

Figure 5:
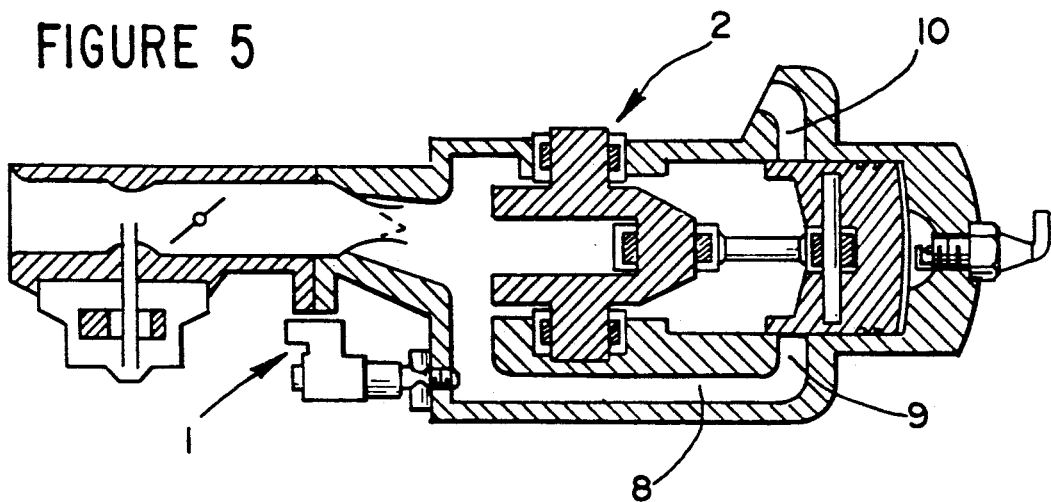

Another location is shown in FIG. 5 where the injector apparatus 1 directs the LPG in liquid form into the transfer port 8 from the crank case to the cylinder inlet port 9. This arrangement may allow for a controlled pulsing of the injected LPG stream such that losses in efficiency of the engine associated with direct discharge of air and fuel from the cylinder inlet port 9 to the cylinder outlet port 10 can be reduced by causing the initial inflow into the cylinder to be low in LPG portion.

It should be evident from the description hereinabove that the present invention provides an improved method and apparatus for injecting liquified gas fuels into internal combustion engines. Contrary to conventional approaches which involve vapourizing the fuel or utilizing a pump to pressurize the fuel into a liquid state, the present invention reduces the temperature of the fuel prior to and during the metering process thereby maintaining the fuel in a liquid state facilitating accurate measurement of fuel pressure and calculation of flow rate. This unique procedure avoids problems associated with fuel pump operation and because the fuel is in a liquid state it enables premixing of lubricant with the liquified gas fuel. The major advantage however is perhaps the cooling of the inducted air stream which lowers the pressure thereof near the injector tip and thereby increases the pressure drop between the inlet to the inducted air stream (not shown) and the injector apparatus resulting in an increase in the flow rate of the inducted air stream. The increase in flow rate results in a greater volume of inducted air on each intake engine stroke and consequently greater engine output power.

The liquified gas fuel in liquid state enters the inducted air stream from the injector nozzle and forms a plume in an expansion zone 16 extending across the inducted air stream as is evident in FIG. 1. It should be further noted that the body 11 of the injector apparatus extends from the point of connection with the engine, outside the heat insulating sleeve 28 to the solenoid 32. In other words there is a heat conducting path to conduct engine heat to the solenoid apparatus to thereby avoid freezing of the solenoid and associated apparatus. This provides a further advantage of the unique arrangement of the embodiment described hereinabove.

I claim:

1. A fuel injector for injecting fuel into an internal combustion engine characterized in that, said fuel comprises or includes liquified gas fuel and said injector includes a body portion incorporating a metering device for continuously metering the desired quantity of fuel to an inlet air stream of the engine via a nozzle of the injector, whereby said liquified gas fuel is cooled below the boiling point of the gas and thus caused to be in a liquid state prior to passing through said nozzle and when entering said air stream, thereby causing a cooling of said inlet air stream in an expansion zone extending from said nozzle into said air stream and wherein at least a portion of the fuel injector extends into said expansion zone such that sufficient heat is transferred from said fuel injector to said expansion zone to maintain said liquified gas fuel in a liquid state in the fuel injector.

2. A fuel injector according to claim 1, wherein said portion of the fuel injector that extends into said expansion zone includes a portion of said metering device which passes through said nozzle and extends into said expansion zone to cause heat transfer from upstream of said nozzle to said expansion zone.

3. A fuel injector according to claim 2, characterized in that, said nozzle includes a valve seat and said metering device includes a needle valve member or poppet valve member for co-operating with said valve seat to control fuel flow through said nozzle, said needle or poppet valve member extending through said nozzle and constituting said portion of said metering device that extends into said expansion zone.

4. A fuel injector according to claim 3, characterized in that, said needle or poppet member is mounted for reciprocating movement in a tubular heat insulating sleeve, which sleeve provides an insulating material between said metering device and body, said sleeve at one end thereof also forming said nozzle and valve seat.

5. A fuel injector according to claim 4, characterized in that, said insulating sleeve is formed of advanced engineering ceramics.

6. A fuel injector according to claim 4, characterized in that, said insulating sleeve is formed of Partially Stabilized Zirconia (PSZ).

7. A fuel injector according to claim 6, characterized in that, said body includes a port providing access to said metering device, said port incorporating a pressure sensor for providing input to an electronic control unit concerning the fuel pressure on the upstream side of said nozzle whereby said control unit is able to determine the fuel flow rate through said nozzle and control operation of said valve according to other input data.

8. A fuel injector according to claim 7, characterized in that, a solenoid is mounted on said body for controlling said reciprocating movement of said valve member, said solenoid being remote from said nozzle and said body providing a heat conductor between said engine and said solenoid to prevent freezing of said solenoid due to said cooling of fuel at, and upstream of said nozzle.

9. A fuel injector according to claim 8, characterized in that, said fuel enters said metering device via a further port in said body which coincides with an aperture in said tubular heat insulating sleeve.

10. A fuel injection according to claim 9, characterized in that, said fuel is a mixture of lubricant and liquid petroleum gas (LPG) and said injector is for use with two stroke ignition cycle engines.

11. A method of injecting fuel into an internal combustion engine, characterized in that, said fuel comprises or includes liquified gas fuel and said method includes causing said fuel to be cooled to a temperature below the boiling point thereof prior to injection into an inlet air stream of the engine by the step of transferring heat from incoming said fuel at a pre-injection zone into an expansion zone in said air stream.

12. A method as defined in claim 11, characterized in that, said fuel is in a liquid state when injected into said air stream.

13. A method as defined in claim 12, characterized in that, it includes expanding said fuel via an injector nozzle and over a protrusion of a metering spool which projects beyond said nozzle and into said air stream, said metering spool transferring said heat from incoming fuel into said expansion zone by means of said protrusion.

14. A fuel injector for injecting fuel into an internal combustion engine, said fuel comprising or including liquified gas fuel and said injector including a metering device for continuously metering the desired quantity of fuel to an inlet air stream of the engine via a nozzle of the injector, a heat transfer member extending between a pre-expansion zone upstream of said nozzle and an expansion zone downstream of said nozzle and in said air stream, whereby heat is transferred from said pre-expansion zone to said expansion zone to thereby cool said fuel to a temperature below the boiling point of the gas prior to and for passage through said nozzle.

15. A fuel injector according to claim 14 wherein said injector includes an insulator of high heat insulating material surrounding said pre-expansion zone and nozzle for reducing heat transfer from said engine to said pre-expansion zone.

16. A fuel injector according to claim 15 wherein said nozzle is formed of high heat insulating material and said metering device is insulated from a body of said injector by said insulator.

17. A fuel injector according to claim 16 wherein said metering device includes a needle or poppet valve member which extends through said nozzle from said pre-expansion zone to said expansion zone and provides said heat transfer member.

18. A fuel injector according to claim 17 wherein said nozzle includes a valve seat and said needle or poppet valve member includes a sealing face for co-operating with said valve seat to provide said metering device.

19. A fuel injector according to claim 18, characterized in that said needle or poppet member is mounted for reciprocating movement in a tubular heat insulating sleeve, which sleeve provides said insulating material between said metering device and body, said sleeve at one end thereof also forming said nozzle and valve seat.

20. A fuel injector according to claim 19, characterized in that, said insulating sleeve is formed of advanced engineering ceramics.

21. A fuel injector according to claim 19, characterized in that, said insulating sleeve is formed of Partially Stabilized Zirconia (PSZ).

22. A fuel injector according to claim 21, characterized in that said body includes a port providing access to said metering device, said port incorporating a pressure sensor for providing input to an electronic control unit concerning the fuel pressure on the upstream side of said nozzle whereby said control unit is able to determine the fuel flow rate through said nozzle and control operation of said valve according to other input data.

23. A fuel injector according to claim 22, characterized in that a solenoid is mounted on said body for controlling said reciprocating movement of said valve member, said solenoid being remote from said nozzle and said body providing a heat conductor between said engine and said solenoid to prevent freezing of said solenoid due to said cooling of fuel at, and upstream of, said nozzle.

24. A fuel injector according to claim 23, characterized in that said fuel enters said metering device via a further port in said body which coincides with an aperture in said tubular heat insulating sleeve.

25. A fuel injection according to claim 24, characterized in that said fuel is a mixture of lubricant and liquid petroleum gas (LPG) and said injector is for use with two stroke ignition cycle engines.

* * * * *